(12) United States Patent
Kitano et al.

(10) Patent No.: US 8,681,299 B2
(45) Date of Patent: Mar. 25, 2014

(54) LIQUID CRYSTAL DISPLAY PANEL

(75) Inventors: Daisuke Kitano, Osaka (JP); Yutaka Sawayama, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 112 days.

(21) Appl. No.: 13/575,199

(22) PCT Filed: Oct. 26, 2010

(86) PCT No.: PCT/JP2010/069006
§ 371 (c)(1),
(2), (4) Date: Jul. 25, 2012

(87) PCT Pub. No.: WO2011/092916
PCT Pub. Date: Aug. 4, 2011

(65) Prior Publication Data
US 2012/0327344 A1    Dec. 27, 2012

(30) Foreign Application Priority Data

Jan. 28, 2010 (JP) ................................ 2010-017211

(51) Int. Cl.
*G02F 1/1337* (2006.01)
*G02F 1/1333* (2006.01)

(52) U.S. Cl.
USPC ........... 349/129; 349/106; 349/107; 349/108; 349/109; 349/110

(58) Field of Classification Search
USPC ........................................ 349/106–110, 129
See application file for complete search history.

(56) References Cited

U.S. PATENT DOCUMENTS

| | | | |
|---|---|---|---|
| 2002/0063834 A1 | 5/2002 | Sawasaki et al. | |
| 2005/0024567 A1 | 2/2005 | Sawasaki et al. | |
| 2007/0258025 A1 | 11/2007 | Sawasaki et al. | |

FOREIGN PATENT DOCUMENTS

| | | |
|---|---|---|
| JP | 2002-148624 A | 5/2002 |
| JP | 2002-162629 A | 6/2002 |
| JP | 2004-61539 A | 2/2004 |
| JP | 2006-201234 A | 8/2006 |
| WO | 2008/084568 A1 | 7/2008 |

OTHER PUBLICATIONS

International Search Report and Written Opinion received for PCT Patent Application No. PCT/JP2010/069006, mailed on Jan. 25, 2011, 12 pages. (5 pages of English translation and 7 pages of PCT Search Report).
U.S. National Stage Application of PCT Application No. PCT/JP2010/068992, filed on Oct. 26, 2010, 17 pages, with English translation in 22 pages.
U.S. National Stage Application of PCT Application No. PCT/JP2010/068995, filed on Oct. 26, 2010, 18 pages, with English translation in 23 pages.

*Primary Examiner* — Phu Vu

(74) *Attorney, Agent, or Firm* — Morrison & Foerster LLP

(57) ABSTRACT

Provided is a liquid crystal display panel which allows high quality display by suppressing a disturbance of liquid crystal molecule alignment caused by formation of liquid crystal alignment control protrusions. The liquid crystal display panel of the present invention is a liquid crystal display panel including a pair of substrates and a liquid crystal layer sandwiched between the pair of substrates, one of the pair of substrates including a colored layer, a light-shielding layer, and walled liquid crystal alignment control protrusions projecting toward the other substrate, the liquid crystal alignment control protrusions including a main protrusion and a secondary protrusion lower than the main protrusion, and the secondary protrusion not being provided along a borderline between the colored layer and the light-shielding layer.

2 Claims, 3 Drawing Sheets

LIQUID CRYSTAL DISPLAY PANEL

CROSS REFERENCE TO RELATED APPLICATIONS

This is a U.S. National Phase patent application of PCT/JP2010/069006, filed Oct. 26, 2010, which claims priority to Japanese Patent Application No. 2010-017211, filed Jan. 28, 2010, each of which is hereby incorporated by reference in the present disclosure in its entirety.

TECHNICAL FIELD

The present invention relates to a liquid crystal display panel. More specifically, the present invention relates to a liquid crystal display panel suitably used for MVA display.

BACKGROUND ART

A liquid crystal display (LCD) panel has a structure in which a liquid crystal layer is sandwiched between a pair of substrates. An image is displayed on the LCD panel when the polarization of light passing through the liquid crystal layer is changed by an alignment change of liquid crystal molecules which is caused by application of a voltage to the liquid crystal layer through electrodes provided on the substrates.

Specific examples of display modes of LCD panels include TN (Twisted Nematic) mode and VA (Vertical Alignment) mode. In TN mode, electrodes are formed on upper and lower substrates. Liquid crystals with a positive dielectric anisotropy are sandwiched between the two substrates in such a manner that the liquid crystals are twisted by 90° between the substrates. Then, the alignment of liquid crystals is switched by an electric field in the longitudinal direction which is vertical to the substrates. In VA mode, liquid crystals with a negative dielectric anisotropy are sandwiched between upper and lower substrates. When an electric field is not applied, liquid crystal molecules are arranged in the vertical direction by a vertical alignment film or the like. The liquid crystal molecules are tilted toward the horizontal direction when the electric field is applied (see Patent Literature 1, for example).

Also, as an applied technology of VA mode, MVA (Multi-domain Vertical Alignment) mode has been developed in which one pixel is divided into plural regions by alignment control protrusions so that the pixel serves as a multi-domain pixel. In MVA mode, liquid crystal molecules in one pixel are controlled to have different inclining directions, which enables uniform gradation display in all directions. Accordingly, contrast, viewing angle characteristic, and response time are excellently exhibited.

Examples of forming methods of the alignment control protrusions include a method in which a photosensitive resin composition absorbing light in photosensitive wavelength region is applied on a color filter, and the photosensitive resin composition is exposed to light through a photomask and then developed for patterning (see Patent Literatures 2 and 3, for example).

CITATION LIST

Patent Literature

Patent Literature 1: JP 2002-148624 A
Patent Literature 2: JP 2004-61539 A
Patent Literature 3: JP 2006-201234 A

SUMMARY OF INVENTION

Technical Problem

The present inventors have conducted an investigation concerning the configuration of a MVA liquid crystal display panel which includes higher liquid crystal alignment control protrusions (hereinafter, also referred to as main protrusions) and, supplementarily, lower liquid crystal alignment control protrusions (hereinafter, also referred as secondary protrusions). The MVA liquid crystal display having such a configuration is not only provided with the liquid crystal alignment control protrusions having the same height are provided so that a pixel is divided, but also accessorily provided with lower liquid crystal alignment control protrusions. Accordingly, liquid crystal molecules can be more precisely divided into the regions in the pixel. Therefore, controllability of the alignment of the liquid crystal molecules can be enhanced. Thus, the display quality is significantly improved.

The present inventors conducted a detailed study on the liquid crystal alignment control protrusions. They focused on that the secondary protrusions to be provided for minor adjustments are preferably provided not only on an aperture area, but also on areas not serving as an aperture area (light-shielding area, for example), while there were no particular problems with the main protrusions because they may be provided on areas serving as an aperture area.

However, the present inventors found out that there was a level difference between the surface of the substrate serving as an aperture area and the surface of the substrate not serving as an aperture area, and this level difference caused another level difference between the secondary protrusions, by which a disturbance of the liquid crystal molecule alignment was caused.

FIG. 6 shows a schematic cross-sectional view illustrating substrates included in a MVA liquid crystal display panel under investigation by the present inventors. A MVA liquid crystal display panel includes a pair of substrates and a liquid crystal layer sandwiched between the pair of substrates. As shown in FIG. 6, one substrate (opposed substrate) 101 of the pair of substrates includes, for example, color filters (colored layer) 131 and a black matrix (light-shielding layer) 132 on a glass substrate. A level difference is provided between each color filter 131 and the black matrix 132. In addition, a common electrode 133 is provided on the whole surface covering the color filters 131 and the black matrix 132. Meanwhile, the other substrate (array substrate) 102 of the pair of substrates includes, for example, pixel electrodes 113 on a glass substrate.

The color filter 131 can be easily and highly accurately formed, for example, by dripping a color filter material into a space divided by the black matrix 132, using an ink-jet method. However, in order to make the color filter material stay in the target space more accurately, the surface on which the color filters are formed is preferably subjected to lyophilic treatment, and the surface of the black matrix 132 is preferably subjected to lyophobic treatment. As a result, a level difference is provided between each color filter 131 and the black matrix 132, and the black matrix 132 is formed higher than the color filters 131.

Therefore, if secondary protrusions 123 are formed on the black matrix 132 which does not serve as an aperture area, a large level difference is formed between the surface of each color filter 131 and the surface of each secondary protrusion 123 provided on the black matrix 132.

Some liquid crystal molecules 151 align toward the secondary protrusions 123, and other liquid crystal molecules 151 align toward a gap between the pixel electrodes 113.

Accordingly, an area occurs where the liquid crystal molecules 151 are pointing to various directions in an aperture area (switching domain), which causes a disclination line. As a result, display quality is deteriorated.

The level difference between each color filter 131 and the black matrix 132 is 0.4 to 0.6 μm in a general producing process. This difference is similar to the height of the secondary protrusions 123 (0.4 to 0.6 μm). Therefore, the level difference becomes twice in the case of providing secondary protrusions, compared to the case of not providing secondary protrusions.

The secondary protrusions 123 on the black matrix 132 could be formed lower. However, it is not preferred because, in such a case, the secondary protrusions 123 need to be formed to have a further thinner shape when manufactured by a conventional method, which significantly reduces manufacturing margin.

FIG. 7 shows an atomic force microscope (AFM) photograph showing a perspective of liquid crystal alignment control protrusions of the MVA liquid crystal display panel under investigation by the present inventors. As shown in FIG. 7, the liquid crystal alignment control protrusions 121 serve as walled partition members projecting toward the other substrate when the opposed substrate is defined as one substrate, or in other words, toward the array substrate side. Additionally, among all the liquid crystal alignment control protrusions 121, main protrusions 122 and secondary protrusions 123 are provided on the color filter 131 (in an aperture area). By the way, there is another protrusion provided in such a manner that the black matrix 132 is divided at the center. This protrusion is provided for preventing leakage between the electrodes of the pair of substrates, and accordingly differs from the liquid crystal alignment control protrusions.

FIG. 8 shows an optical micrograph showing the substrate surface at an extinction position, which is included in the MVA liquid crystal display panel under investigation by the present inventors. As obvious from comparison of parts shown by white circles in FIG. 8, no emission line occurs in a part without liquid crystal alignment control protrusions. In contrast, an emission line occurs in a part with liquid crystal alignment control protrusions. This means that a disturbance of the liquid crystal molecule alignment occurs in a partial area adjacent to the secondary protrusions. The micrograph shown in FIG. 8 was taken at an extinction position. Accordingly, the emission line is shown as a dark line in normal display mode.

The present invention was devised with the above current situation considered, and aims to provide a liquid crystal display panel which suppresses a disturbance of the liquid crystal molecule alignment caused by formation of liquid crystal alignment control protrusions, and allows high quality display.

Solution to Problem

The present inventors have investigated a method for suppressing a disturbance of the liquid crystal molecule alignment with taking advantages gained by assorting the liquid crystal alignment control protrusions into main protrusions and secondary protrusions. Then, they focused on the form of the secondary protrusions to find out that a level difference between the substrate surfaces, which would be caused by formation of the secondary protrusions on a boundary region between the light-shielding layer and the colored layer, can be avoided by not providing secondary protrusions along the borderline between the light-shielding layer and the colored layer. Thereby, they also found out that the liquid crystal molecules can be aligned without causing a large disturbance of the liquid crystal molecule alignment due to the level difference. Thus, the above problems were completely solved and the present invention has been accomplished.

In other words, the present invention is a liquid crystal display panel including a pair of substrates, and a liquid crystal layer sandwiched between the pair of substrates, one of the pair of substrates including a colored layer, a light-shielding layer, and walled liquid crystal alignment control protrusions projecting toward the other substrate, the liquid crystal alignment control protrusions including a main protrusion, and a secondary protrusion lower than the main protrusion, and the secondary protrusion not being provided along a borderline between the colored layer and the light-shielding layer.

The following describes in detail of the liquid crystal display panel of the present invention.

The liquid crystal display panel of the present invention includes a pair of substrates and a liquid crystal layer sandwiched between the pair of substrates. One of the pair of substrates can be used for an array substrate, and the other can be used for a color filter substrate, for example. The alignment of liquid crystals can be controlled in each pixel electrode (sub-pixel) by provision of plural pixel electrodes on the array substrate. On the color filter substrate, a display color can be controlled in each pixel by color filters (colored layer) each formed of R (red), G (green), B (blue) or the like provided on a position overlapping with the pixel electrodes of the array substrate, for example.

One of the pair of substrates provides a colored layer, a light-shielding layer, and walled liquid crystal alignment control protrusions projecting toward the other substrate. The liquid crystal alignment control protrusions serve as walled partition members, and can divide liquid crystal molecules near the surface of one of the substrates into the separate areas. The liquid crystal alignment control protrusions are formed of, for example, a dielectric (insulator) material. Even if no voltage is applied to the liquid crystal layer, liquid crystal molecules can be inclined toward the liquid crystal alignment control protrusions.

The liquid crystal alignment control protrusions include main protrusions and secondary protrusions lower than the main protrusions. As the liquid crystal alignment control protrusions, the secondary protrusions are supplementarily provided in addition to the main protrusions which mainly control the liquid crystal molecule alignment. Such a configuration enables the liquid crystal molecules to be divided into the areas more accurately and then the controllability of the liquid crystal molecule alignment is enhanced. Thereby, display quality is improved.

The secondary protrusions are not provided along the borderline between the colored layer and the light-shielding layer. The areas where the colored layer is formed serve as an aperture area. The areas where the light-shielding layer is formed serve as areas other than the aperture area. Accordingly, formation of secondary protrusions along the borderline between the colored layer and the light-shielding layer enhances the alignment controllability of the liquid crystal molecules in the aperture area. However, such a configuration brings a large level difference on the borderline between the colored layer and the light-shielding layer, which causes a disturbance of the liquid crystal alignment. Therefore, the secondary protrusions are not provided on the borderline between the colored layer and the light-shielding layer, but provided only on other regions, whereby the effects of formation of the secondary protrusions can be efficiently achieved.

The configuration of the liquid crystal display panel of the present invention is not especially limited by other components as long as it essentially includes such components. Preferable embodiments of the liquid crystal display panel of the present invention are described in details in the following.

The secondary protrusions preferably have a narrower width than the main protrusions. The narrower width of the secondary protrusions than the width of the main protrusions enables improvement of the aperture ratio. Although the narrower width of the secondary protrusions slightly deteriorates the alignment force, display quality is rarely affected because the secondary protrusions only work as supplementary protrusions.

Advantageous Effects of Invention

The liquid crystal display panel of the present invention can suppress a disturbance of liquid crystal molecule alignment caused by formation of liquid crystal alignment control protrusions, and allows high quality display.

DESCRIPTION OF EMBODIMENTS

Figure 1:
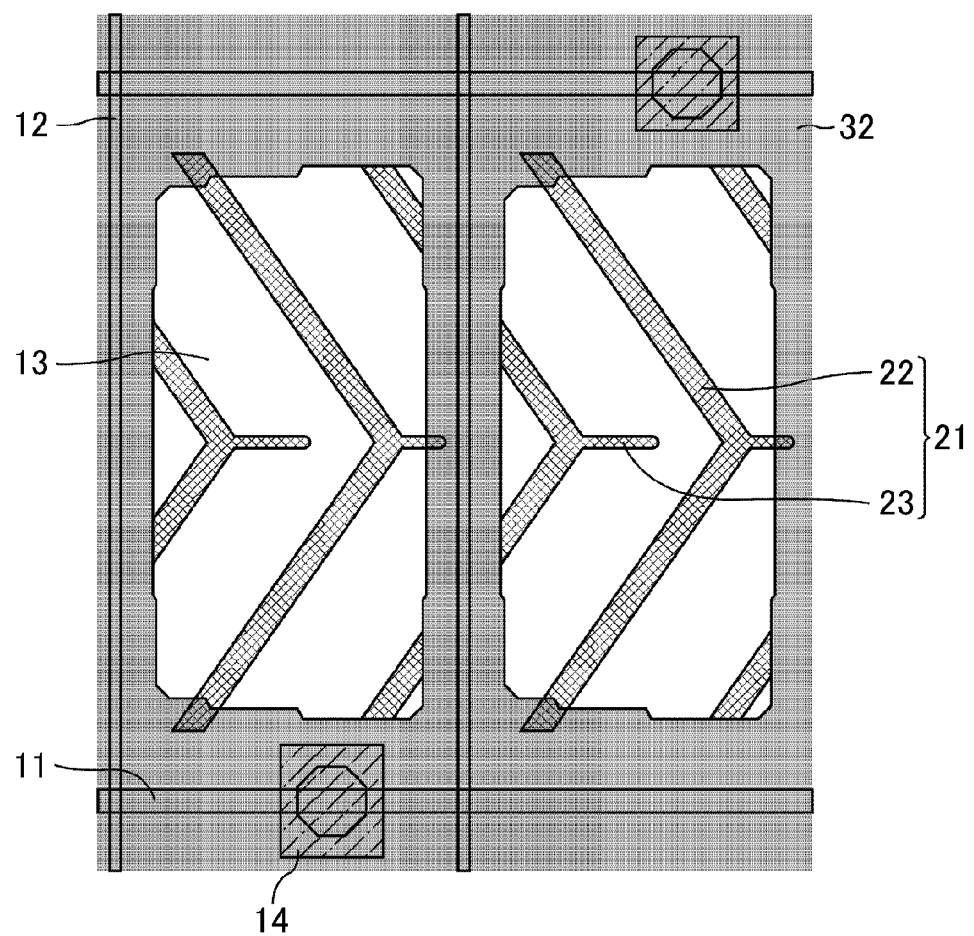
FIG. 1 shows a magnified schematic plan view illustrating the one substrate surface of a liquid crystal display panel according to Embodiment 1.

The present invention will be mentioned in more detail referring to the drawings in the following embodiments, but is not limited to these embodiments.
Embodiment 1

The liquid crystal display panel of Embodiment 1 includes a pair of substrates and a liquid crystal layer sandwiched between the pair of substrates. FIG. 1 shows a magnified schematic plan view illustrating the one substrate surface of the liquid crystal display panel according to Embodiment 1.

As shown in FIG. 1, in the liquid crystal display panel of Embodiment 1, one substrate (hereinafter, also referred to as an array substrate) comprises scanning wirings 11 extended in the line direction, and signal wirings 12 extended in the column direction. Each area surrounded by these wirings serves as a sub-pixel.

The array substrate has a plurality of pixel electrodes 13, and one pixel electrode 13 is provided in each sub-pixel. In other words, the pixel electrodes 13 are arranged in the line direction and column direction to form a matrix. Driving of each pixel electrode 13 is separately controlled by various wirings (the scanning wirings 11 and the signal wirings 12, provided on gaps between the pixel electrodes 13), and switching elements such as thin film. transistors (TFT) provided on areas adjacent to intersections of those wirings. Each pixel electrode 13 has a rectangular shape, a rectangular shape with a flat notch or a projection, and the like. The shape of each pixel electrode 13 does not need to completely correspond to the shape of an aperture of a black matrix described below.

A color filter is provided in each sub-pixel region on the other substrate (hereinafter, also referred to as an opposed substrate). Also, the color filter may be provided not on the opposed substrate, but on the array substrate.

A specific color of one pixel is shown by color filters of different colors. Accordingly, one pixel comprises a plurality of sub-pixels corresponding to the number of the color filters. The color combination of the color filters included in one pixel include, for example, a trichromatic combination consisting of red (R), green (G), and blue (B), and other colors such as yellow (Y) and white (W) may be further added thereto.

On the opposed substrate, a black matrix 32 is provided on gaps between the color filters in order to prevent light leakage and mixed color in the gaps between the color filters. In Embodiment 1, areas where the black matrix 32 is not provided serve as an aperture area.

On some places where the black matrix 32 is provided, columnar spacers 14 are provided to keep a constant distance between the pair of substrates included in the liquid crystal display panel.

On the whole surface covering the color filters and the black matrix 32, a common electrode is provided. The common electrode and the pixel electrodes 13 of the array substrate can form an electric field in the liquid crystal layer.

In the liquid crystal display panel of Embodiment 1, which is MVA mode, liquid crystal alignment control protrusions 21 (hereinafter, also referred to as ribs) each having a linear shape in a plan view of the panel surface (substrate surface) are provided on the common electrode of the opposed substrate. Each rib 21 has a bend, and the ribs form a zigzag as a whole in a view of the whole screen regardless of the divisions of pixels. The extending direction of each rib 21 is decided so as to have an angle (30° to 60°, for example) against the short side and long side of each pixel electrode 13. Therefore, even one rib 21 can divide one sub-pixel into plural regions.

The ribs 21 are made from a dielectric (insulator) such as novolac resin, and therefore each rib 21 can align the adjacent liquid crystal molecules toward the rib 21 even when voltage is not applied. Accordingly, liquid crystal molecules point to different directions by region divided by the rib 21, whereby a wide viewing angle is achieved.

As shown in FIG. 1, a rib 21 comprises a main rib (main protrusion) 22 having a V-shape or a linear shape, and sub ribs (secondary protrusions) 23 the extending direction of which has an angle against the extending direction of the main rib 22. A main rib 22 having a V-shape easily divides one sub-pixel equally, whereby a wide viewing angle can be achieved. Supplemental provision of the sub ribs 23 extending from a part of such a main rib 22 makes it possible to adjust the alignment of the liquid crystal molecules more precisely. Therefore, the display quality can be improved.

Each sub rib 23 extends from a bending part (crooked part) of a main rib 22. The sub ribs 23 do not need as a strong alignment force as the main ribs 22 do. Therefore, the sub ribs 23 are formed lower than the main ribs 22 and have a narrower width than the main ribs 22. The sub ribs are not provided along the borderline between each color filter and the black matrix 32 so as not to enlarge the level difference between each color filter and the black matrix 32. The extending direction of each main rib 22 is set in such a manner that the main rib 22 has an angle against an outer edge of the sub-pixel. The extending direction of each sub rib 23 is set along with the line direction or column direction of the sub-pixel.

Figure 2:
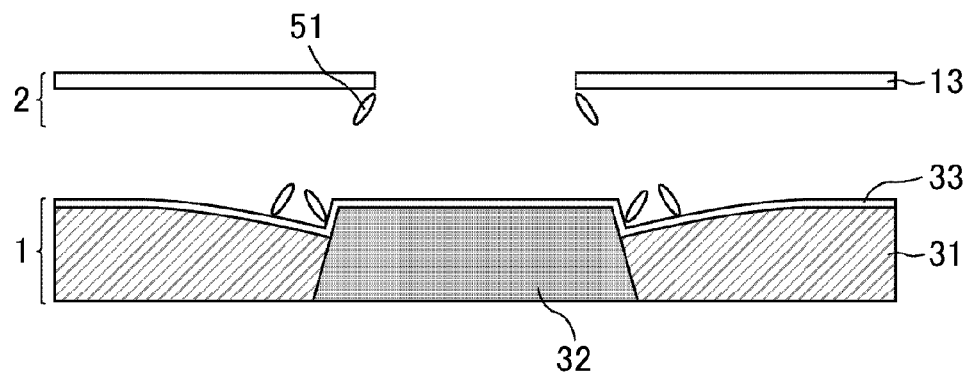
FIG. 2 shows a schematic cross-sectional view of a liquid crystal alignment control protrusion of the liquid crystal display panel according to Embodiment 1.
Figure 3:
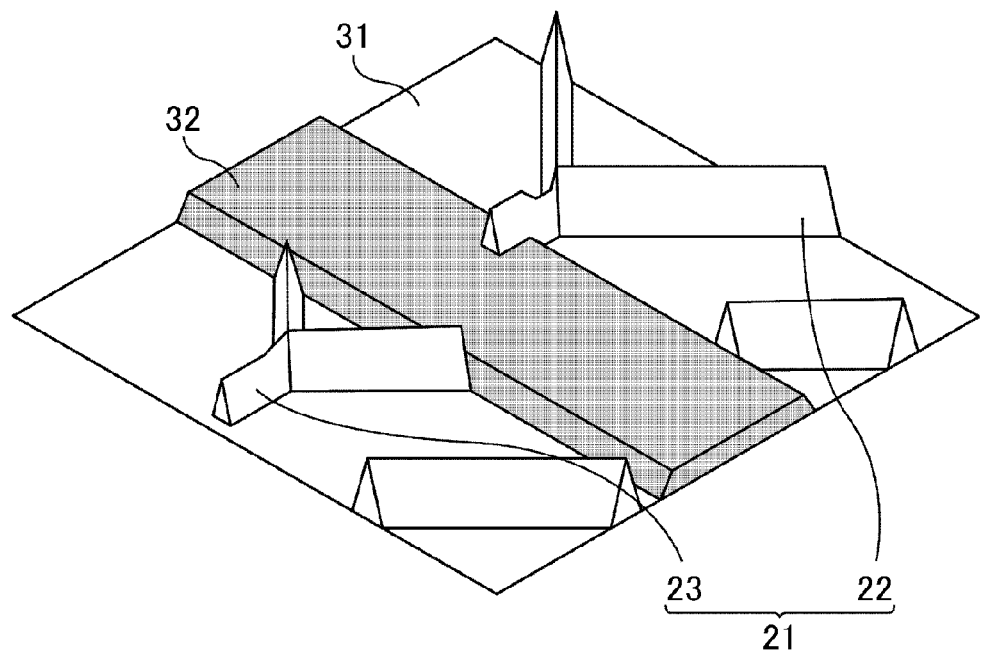
FIG. 3 shows a schematic perspective view of liquid crystal alignment control protrusions of the liquid crystal display panel according to Embodiment 1.

FIG. 2 shows a schematic cross-sectional view of a liquid crystal alignment control protrusion of the liquid crystal display panel according to Embodiment 1. Also, FIG. 3 shows a schematic perspective view of the liquid crystal alignment control protrusions of the liquid crystal display panel according to Embodiment 1. As shown in FIG. 2 and FIG. 3, the ribs 21 serve as walled partition members projecting toward the array substrate 2 which is the other substrate when the opposed substrate 1 is defined as one substrate. Among all the ribs 21, the main ribs 22 and the sub ribs 23 are provided on the color filters 31 (in the aperture area). In addition, a common electrode 33 is provided on the whole surface covering the color filters 31 and the black matrix 32.

The pixel electrodes 13 are provided on the array substrate 2 in such a manner that a gap between the pixel electrodes 13 overlaps the black matrix 32.

The sub ribs 23 are formed on the color filters 31, but not provided along the borderline between each color filter 31 and the black matrix 32. Thereby, the level difference at the border between each color filter 31 and the black matrix 32 is more flattened than that when the sub ribs are provided on the borderline between each color filter and the black matrix. Accordingly, it is possible to suppress an alignment disturbance of liquid crystal molecules 51 at the border between each color filter 31 and the black matrix 32, with enjoying the advantages gained by dividing the ribs 21 into the main ribs 22 and the sub ribs 23. As a result, the display quality is improved.

These main ribs and sub ribs can be formed by the following photolithography using a gray-tone mask.

Firstly, a positive photosensitive resin material such as novolac resin is applied to the surface of the opposed substrate by a spin coat method or the like, and then desolvated to form a photosensitive resin film. Secondly, a mask is placed on a specific position, and the surface of the opposed substrate is exposed through the mask. The exposure is carried out at 250 mJ/cm$^2$, for example. Then, the exposed photosensitive resin film is developed for one minute using potassium hydrate, and the resulting film is processed through a firing step at 200° C. for 20 minutes. Thereby, the unexposed parts remain, which were covered by a light shielding portion at the exposure.

More specifically, among the various portions of the mask, the light shielding portion is placed above the region where the main ribs are formed, and the gray-tone portion is placed above the region where the sub ribs are formed, when the exposure is performed. This enables irradiations on both regions where the main ribs and the sub ribs are formed by one exposure, whereby the whole rib including the main ribs and the sub ribs is patterned.

Figure 4:
FIG. 4 shows an optical micrograph showing the substrate surface at an extinction position, which is included in a liquid crystal display panel (Comparative Embodiment 1) in which sub ribs are provided along the borderline between each color filter and the black matrix.
Figure 5:
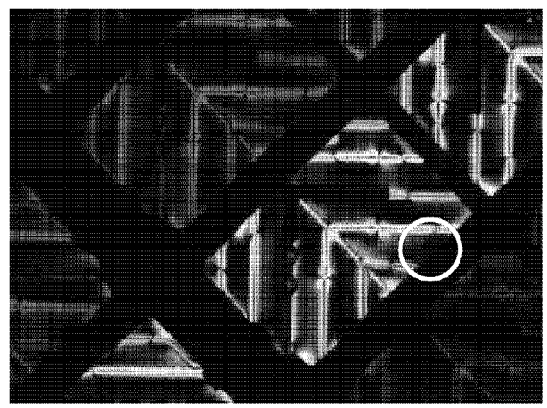
FIG. 5 shows an optical micrograph showing the substrate surface at an extinction position, which is included in a liquid crystal display panel (Embodiment 1) in which sub ribs are not provided along the borderline between each color filter and the black matrix.
Figure 6:
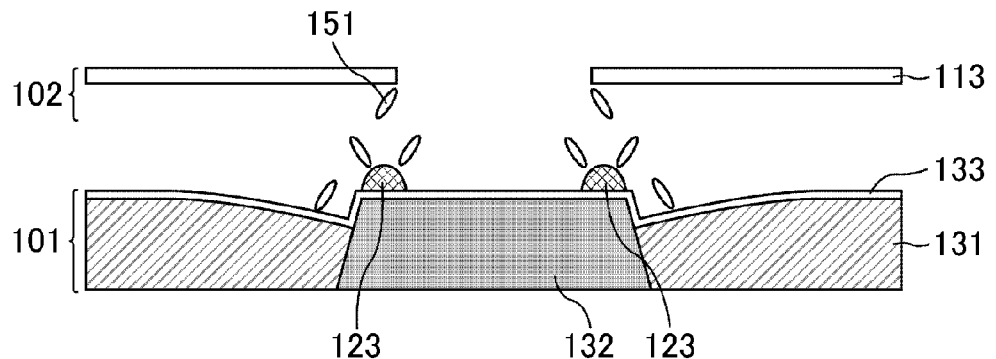
FIG. 6 shows a schematic cross-sectional view of substrates comprising a MVA liquid crystal display panel under investigation by the present inventors.
Figure 7:
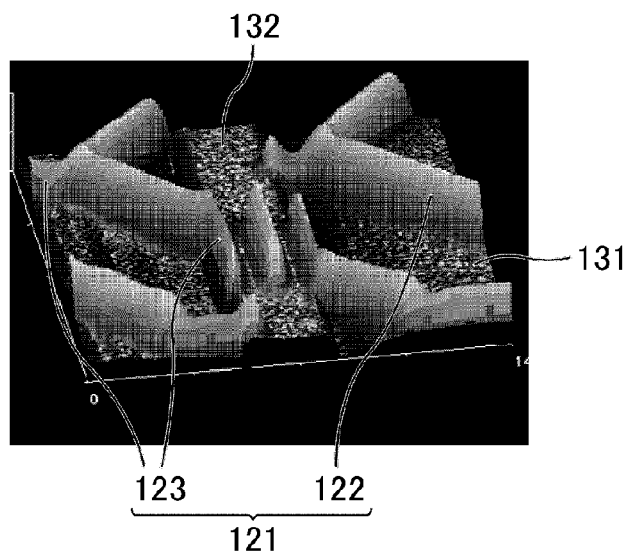
FIG. 7 shows an atomic force microscope (AFM) photograph showing a perspective of liquid crystal alignment control protrusions of the MVA liquid crystal display panel under investigation by the present inventors.
Figure 8:
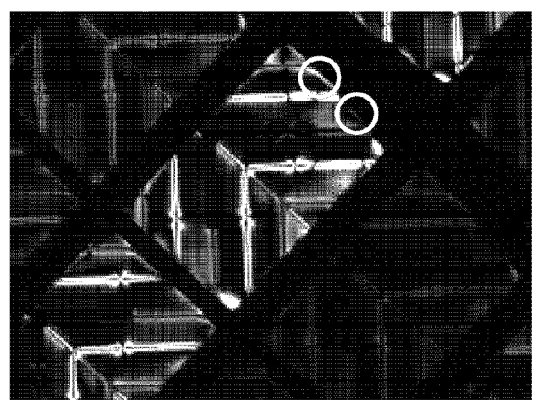
FIG. 8 shows an optical micrograph showing the substrate surface in dark display mode, which is included in the MVA liquid crystal display panel under investigation by the present inventors.

FIG. 4 shows an optical micrograph showing the substrate surface at an extinction position, which is included in a liquid crystal display panel (Comparative Embodiment 1) in which sub ribs are provided along the borderline between each color filter and the black matrix. FIG. 5 shows an optical micrograph showing the substrate surface at an extinction position, which is included in a liquid crystal display panel (Embodiment 1) in which sub ribs are not provided along the borderline between each color filter and the black matrix.

A comparison between a region shown by a white circle of FIG. 4 and that of FIG. 5 clarifies that the region of FIG. 4 turns white while the region of FIG. 5 remains black. Accordingly, the structure of Embodiment 1 does not cause a white blur region such as the one observed in Comparative Embodiment 1. In other words, no dark region, corresponding to the white blur region, occurs in a displaying state. Therefore, high quality display can be achieved.

The present application claims priority to Patent Application No. 2010-017211 filed in Japan on Jan. 28, 2010 under the Paris Convention and provisions of national law in a designated State, the entire contents of which are hereby incorporated by reference.

REFERENCE SIGNS LIST 1, 101: Opposed substrate
2, 102: Array substrate
11: Scanning wiring
12: Signal wiring
13, 113: Pixel electrode
14: Columnar spacer
21, 121: Rib (liquid crystal alignment control protrusion)
22, 122: Main rib (main protrusion)
23, 123: Sub rib (secondary protrusion)
31, 131: Color filter (colored layer)
32, 132: Black matrix (light-shielding layer)
33, 133: Common electrode
51, 151: Liquid crystal molecule

The invention claimed is:

1. A liquid crystal display panel comprising:
a pair of substrates, and
a liquid crystal layer sandwiched between the pair of substrates,
one of the pair of the substrates comprising:
a colored layer,
a light-shielding layer, and
walled liquid crystal alignment control protrusions projecting toward the other substrate,
the liquid crystal alignment control protrusions comprising:
a main protrusion, and
a secondary protrusion lower than the main protrusion, and
the secondary protrusion not being provided along a borderline between the colored layer and the light-shielding layer.

2. The liquid crystal display panel according to claim 1, wherein the secondary protrusion has a narrower width than the main protrusion.

* * * * *